March 3, 1959     A. M. SOUTHWICK     2,875,454
HIVE INSPECTION TOOL
Filed July 2, 1957
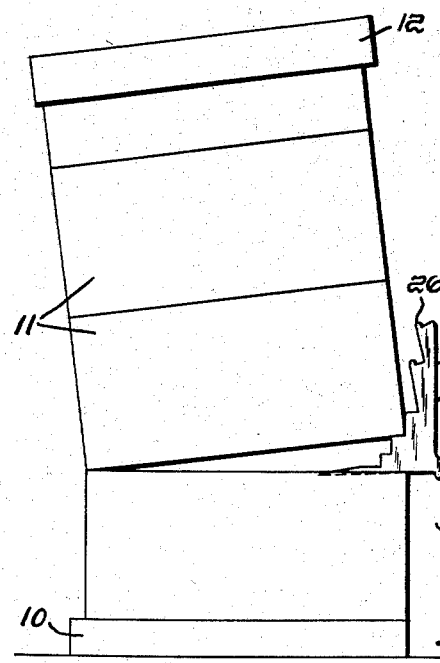
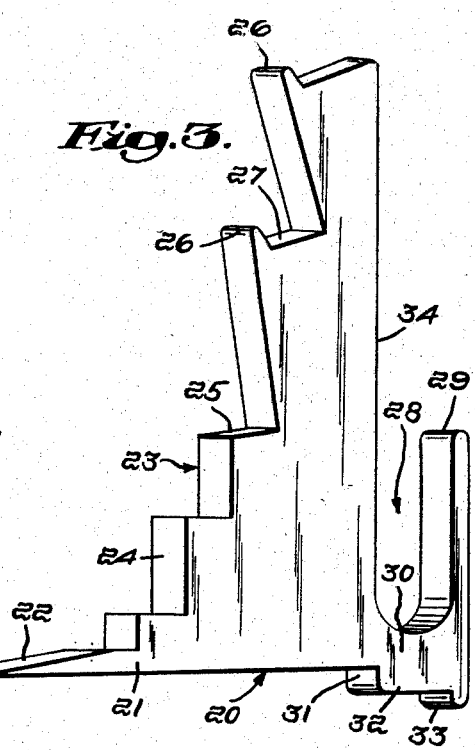
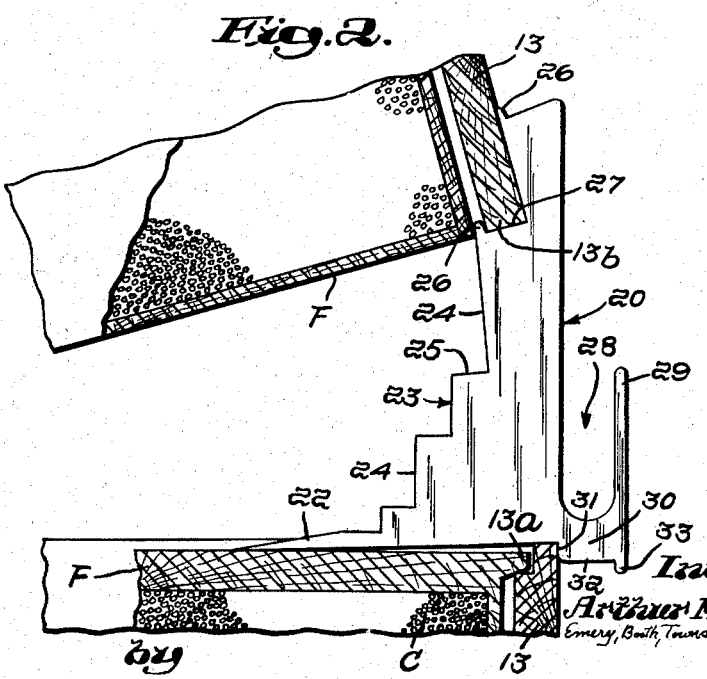

United States Patent Office 2,875,454
Patented Mar. 3, 1959

2,875,454
HIVE INSPECTION TOOL

Arthur M. Southwick, Waban, Mass.

Application July 2, 1957, Serial No. 669,502

6 Claims. (Cl. 6—12)

This application relates generally to beekeeping and more particularly to tool devices accessory thereto. The invention provides a new and improved apparatus or tool for opening up a beehive incident to and for inspection of the same. With the tool of the invention hive inspections are made more quickly and easily, and with less disturbance of the bees and danger to the beekeeper, than heretofore.

The invention will be better understood from a consideration of the following specification taken in conjunction with the accompanying drawing in which:

Fig. 1 shows the tool in operative position, inserted between and supporting adjacent hive sections spaced apart for inspection;

Fig. 2 is a larger scale view of the tool in another operative position of wider separating and interlocking support of higher hive stories; and Fig. 3 is a still larger scale, perspective view of the tool.

A necessary and important routine in the art and science of keeping bees is the visual inspection of the honeycombs to determine the quantity, progress and placement of the bees, the brood, the queen cells, the stores and the finished honey, also and more generally the space and congestion of the combs. This visual inspection must be made periodically and frequently, and throughout the entire year excepting, in northern climes, the winter months.

The honeycombs are contained within relatively simple and largely uniform housing structures or beehives. Referring to Fig. 1, a usual beehive construction is there shown to include a base or stand 10 containing the entrance and on which are stacked a series of generally similar tiers or stories 11, topped as commonly by a protective hood or cover 12.

In the assembly of the beehive stories 11, a number of which are required for a strong colony, the stories are simply laid one above the other in a stack, in which they are retained by their own weight and that of the combs, and also by the propolis or wax with which the bees seal up the hive openings. The one or more hive stories 11 are seen as generally similar boxes which are open at the top and bottom, and house each a series of vertical frames F in which the honeycomb C are built, and which are suspended on ledges or the like 13a formed at the box end walls 13.

To inspect the honeycombs according to present practice the beekeeper must actually dismantle his beehives, that is, life and shift the boxes 11 by hand, first unpiling from the top until every comb-containing story has been exposed top and bottom, and then repiling from the bottom, by hand, and until the entire stack has been reassembled. Or, as practiced by some commercial beekeepers, the hive stories may be tipped back all at once, as on a handtruck, and then restacked by peeling off the bottom.

This customary hive inspection process is at best carried out slowly, laboriously, and with disturbance of the bees. The awkward, tedious shifting of the heavy, cumbersome hive stories fatigues the beekeeper and jars the bees, inciting them to sting.

In accordance with this invention the beekeeper inspects his combs rapidly, through limited and temporary openings into the hive, and without removal of the stories or excessive annoyance to the bees. The invention tool is designed more particularly to be thrust between the successive hive stories and to hold the stories spaced apart at distances suitable to the desired inspections, while also retaining the upper stories against toppling or sliding from the hive. As more fully appearing hereinafter this radical revision of the hive inspection process is afforded by a device of unique integral design, compact durable construction and simple and efficient operation.

The faster, simpler and safer hive inspections in accordance with and by the tool of the invention will be understood also to suffice for all customary inspection procedures except those occasional manipulations which require all cells of the individual combs to be seen.

In the exemplary embodiment herein my hive inspection tool is seen to comprise a rigid unitary body or member 20 of metal, wood, plastic, or other available material combining desired hardness, toughness and low cost. The tool 20 may be generally flat sided, and of a width or thickness affording the desired hive story engaging surface and also weight. It is formed with a straight, smooth-sliding bottom or base 21 extending forwardly to a transverse sharp pointed wedge 22. The body portion of the tool is seen as of generally triangular configuration, and to be defined at its inclined front face by a series of serrations or steps 23.

In accordance with the invention the faces or risers 24 and rests or treads 25 of the steps, vertical and horizontal at the bottom, are inclined or tipped forward at the intermediate and upper steps at angles increasing progressively toward the top. This progressively greater tipping forward of the steps 23 is calculated to orient them at the same inclination as a hive story has when its one end is elevated for seating thereon, noting Figs. 1 and 2.

It will be appreciated that the upper hive stories may be tipped up at a steeper angle, for a wider opening. Accordingly, one or more of the uppermost of the steps 23 have frontal upstanding projections or ridges 26 defining inwardly thereof the recesses 27. These hive story seating recesses 27 will be seen to be of a width snugly to embrace the lower margins 13b, Fig. 2, of box end walls 13.

My novel hive tool comprises further a rearwardly extending handle 28 defined by a generally vertical grip projection 29 extending upwardly or downwardly from a lateral neck 30 joining the handle to the main body of the tool. With a neck 30 joining the handle 28 as herein at the bottom portion of the tool the grip 29 projects upwardly, as shown. The handle 28 may also be joined at another or upper tool body portion in which case and for compactness and optimum thrust the grip 29 will project downwardly. In either case the grip projection 29 is arranged and of a length also to present a hook for hanging the tool, as hereinafter mentioned.

The tool bottom is desirably provided also with an intermediate downfacing rib or stop projection 31 underlying rearwardly the topmost step 23. This stop projection 31 is arranged longitudinally of the tool to abut the end 13 of a lower hive story when the next higher story is seated on the next to last step 23, Fig. 2.

In the illustrated embodiment the tool bottom is defined further by a step 32 extending rearwardly of stop 31 to a second, lower stop 33, and having a function hereinafter explained.

The rear face 34 of the hive tool, apart from the handle 28, may have generally straight vertical extent, as herein shown. Or, being a non-working face, it may have such other configuration as is appropriate to the particular weight and balance desired for the tool.

In a preferred manner of use of the invention apparatus the hive is approached at one end with the tool hung by its hook 29 on the belt or pocket, leaving one hand free for the smoker and the other for a standard hive tool, which is a metal strap pointed at one end and hooked at the other. Starting at the bottom of the hive, the beekeeper first inserts the point of the strap between adjacent stories 11, near one corner, and so as to force the desired end opening. The tool 20 of the invention is then grasped by the handle 28 and thrust in midway of the hive end, the strap and wedge 22 being worked in by thrusting and prying, until the upper of the separated stories is seated on the lowermost step 23.

It may be desirable at this point to smoke through the crack thus opened in the hive wall, to control the bees there.

The hive opening is then progressively enlarged to the desired width. For raising the upper story or stories first to the second step 23, they are levered with the strap while the tool 20 is slid in.

Thereafter it will be more convenient to dispense with the strap and use the hand for subsequent higher raising of the upper stories, as necessary to their seating on the higher steps 23.

When the upper story or stories 11 are resting on one of the higher steps 23 of the invention tool, the step recess 27 hooks, embraces or engages securely around the lower margin 14 of said story, and its sliding off the hive is prevented also by the abutting of stop 31 against hive end wall 13, and by rocking of tool wedge 22 down against the frame F, Fig. 2. With the embodiment of the tool herein shown, and upon raising the upper hive story for seating on the highest tool step 23, the tool is lifted and advanced on step 32 to bring the second stop 33 into abutment with the hive story end 13. The upper story is then lowered for seating in topmost step recess 27.

Upon completion of the inspection, and to close the hive opening, substantially the reverse of the described hive tool manipulating process may be carried out. Or, if not heavy, it may be convenient to lower the elevated hive stories by hand, in one manipulation.

As those skilled in the art will appreciate, the earlier mentioned "smoking" of the bees, to disperse clusters of the same, may be repeated as necessary during the described hive tool manipulation and hive comb inspection.

It will be understood that my invention is not limited to the particular embodiments thereof illustrated and described herein, and I set forth its scope in my following claims.

I claim:

1. A hive inspection tool comprising a rigid unitary member having a forwardly projecting wedge adapted to separate adjacent hive stories, a front face formed with steps for supporting said stories at varying spacings, and a handle on said member opposite and for thrusting said wedge.

2. A hive inspection tool comprising a rigid unitary member having a forwardly projecting wedge adapted to separate adjacent hive stories, a front face formed with steps for supporting said stories at varying spacings, said steps inclined correspondingly to said stories at said spacings, and a handle on said member opposite and for thrusting said wedge.

3. A hive inspection tool comprising a rigid unitary member having a forwardly projecting wedge adapted to separate adjacent hive stories, a front face formed with steps for supporting said stories at varying spacings, a handle on said member opposite and for thrusting said wedge, and a stop for engaging said hive upon advancing of said member for seating the upper of said stories on an upper one of said steps.

4. A hive inspection tool comprising a rigid unitary member having a forwardly projecting wedge adapted to separate adjacent hive stories, a front face formed with steps for supporting said stories at varying spacings, a handle on said member opposite and for thrusting said wedge, and a projection on said member arranged and adapted to abut the end of the lower of said stories as the upper is seated on the higher of said steps.

5. A hive inspection tool comprising a rigid integral generally triangular member having a straight sliding base and a stepped front face intersecting said base at a transverse wedge adapted for thrusting between and forcing apart adjacent hive stories, the steps of said front face oriented for seating the upper at varying attitudes to and spacings from the lower of said adjacent stories, and the upper of said steps recessed for snugly fitting around and retaining said upper stories at the greater of said spacings.

6. A hive inspection tool comprising a rigid integral generally triangular member having a forward wedge portion adapted for forcing apart adjacent hive stories, a series of steps above and rearwardly of said wedge and for supporting said stories at varying openings, a handle opposite said wedge and manipulable for inserting the tool between said hive stories, and a base formed by and between said wedge and handle and having a forward slide and a rearward projection, said slide for easing and said projection for stopping said inserting.

References Cited in the file of this patent

UNITED STATES PATENTS

| 212,806 | Lakins et al. | Mar. 4, 1879 |
| 1,599,595 | Sponsel | Sept. 14, 1926 |

FOREIGN PATENTS

| 273,427 | Great Britain | July 7, 1927 |